Nov. 30, 1965  H. HODKINSON  3,220,513
FRICTION PAD RETAINING MEANS FOR CALIPER TYPE DISC BRAKES
Filed Dec. 10, 1963  2 Sheets-Sheet 1
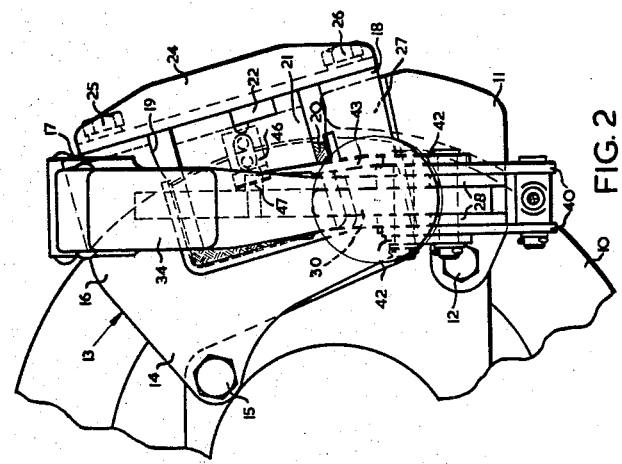
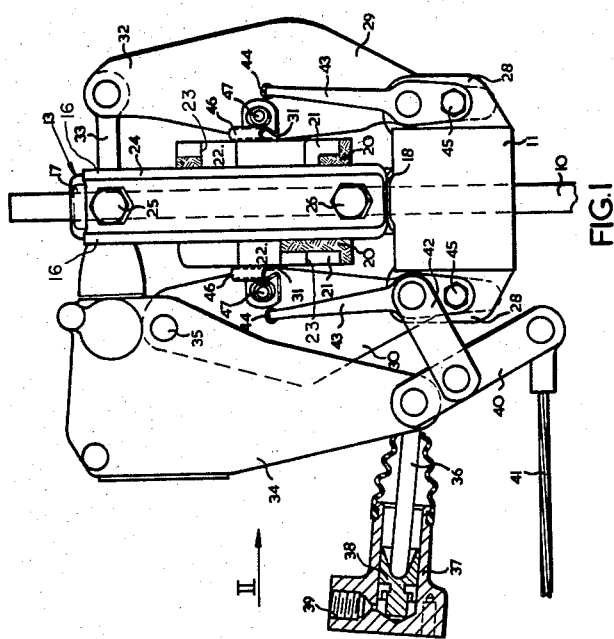

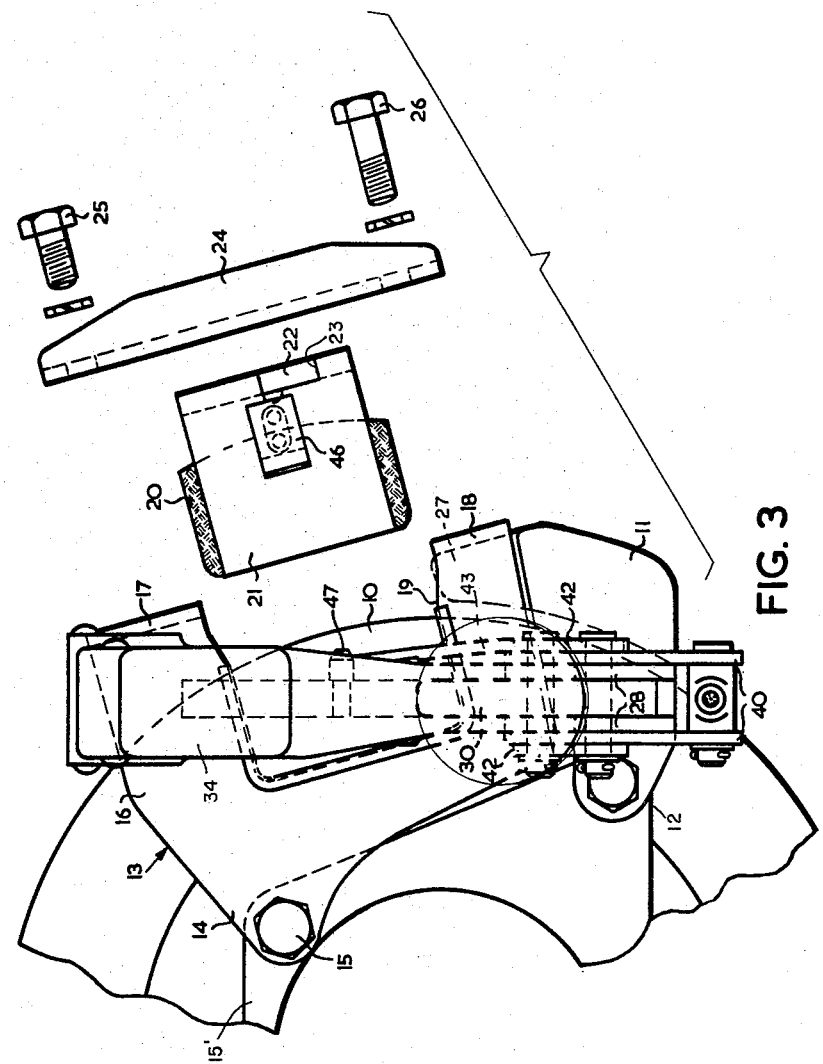

United States Patent Office 3,220,513
Patented Nov. 30, 1965

3,220,513
FRICTION PAD RETAINING MEANS FOR
CALIPER TYPE DISC BRAKES
Harold Hodkinson, Finham, near Coventry, England, assignor to Dunlop Rubber Company Limited, London, England, a corporation of Great Britain
Filed Dec. 10, 1963, Ser. No. 329,561
6 Claims. (Cl. 188—73)

In British specification No. 709,305 I have described a disc brake which comprises an annular disc rotatable by a vehicle wheel, nonrotatable friction pad guide plates located adjacent each radially-extending side of the disc and provided with axially-extending holes therethrough, pads of friction material located in said holes and slidable into frictional engagement with said disc, means to force said pads into frictional engagement with said disc and a fluid pressure operated mechanism associated with said means and located remote from said friction pads for effecting said engagement.

The object of the present invention is to provide improvements in the disc brake assembly referred to above.

According to the present invention a disc brake assembly comprises an annular disc rotatable by a vehicle wheel, a nonrotatable guide member straddling the outer periphery of the disc with limbs located adjacent each radially-extending side of the disc and provided with axially-extending apertures therethrough, friction elements located in said apertures and slidable therein to frictionally engage said disc, means to force said friction elements into frictional engagement with said disc and an actuating mechanism associated with said means and located remote from said friction pads for effecting said engagement, wherein the axially-extending apertures are bounded adjacent the periphery of the disc by a detachable friction element retaining member.

One embodiment of the present invention will now be described with reference to the accompanying drawings in which:

FIGURE 1 is an axial view of a disc brake assembly constructed in accordance with the present invention;

FIGURE 2 is a view of the same disc brake assembly from the left-hand side the FIGURE 1, looking in the direction of the arrows 2—2 in FIGURE 1;

FIGURE 3 is an enlargement of FIGURE 2 showing in exploded view the method of removing the friction elements.

The disc brake to be described is usable for motor vehicles and comprises an annular disc 10 secured to a rotatable portion of the vehicle (not shown).

A caliper-type housing 11 straddles the outer periphery of the disc and is secured at one side thereof to a nonrotatable part of the wheel assembly by a bolt 12.

A U-shaped guide member 13 straddling the outer periphery of the disc 10 is provided with a lug 14 bolted to a nonrotatable part 15' of the vehicle by means of a bolt 15. The two limbs 16 of the nonrotatable guide member 13 extend parallel to and adjacent to the braking surfaces of the disc or rotor 10 and are united adjacent the outer periphery of the disc by a pair of bridge pieces 17, 18. Each of the limbs 16 is provided with a substantially rectangular aperture 19 which merges together, adjacent the outer periphery of the disc, with the corresponding aperture on the opposite side of the disc.

In each of the apertures 19 is located a friction element, constituted by a pad 20 of friction material and an associated backing plate 21 to which the friction pad is fixed. Each backing plate 21 is formed with an out-turned ear 22 which extends axially adjacent the outer periphery of the disc to slidably engage in a groove 23 on the other backing plate and abut against the companion ear 22 on the other backing plate to prevent tilting of the friction elements relative to the braking surfaces of the disc 10. Such a construction is more fully described in United States Patent No. 3,124,217 issued March 10, 1964.

A detachable friction element retaining member 24 is fixed to the bridge pieces 17, 18 adjacent the outer periphery of the disc by means of bolts 25 and 26. With this arrangement the retaining member 24 abuts the radially outer surfaces of the ears 22 to prevent movement of the friction elements in a radial direction while the retaining member 24 is in place.

The bolt 26 also serves to attach the bridge piece 18 of the guide member 13 to a tongue 27 extending circumferentially adjacent the periphery of the disc from the caliper-type housing 11.

The caliper-type housing 11 is provided, on each side of the disc 10, with a slotted bracket 28, each receiving one of two lever members 29, 30 pivotably secured thereto and extending chordally across the disc. The axially-inner part of each lever member 29, 30 is provided, intermediate its ends, with a projecting portion 31 arranged to contact the centre of pressure of backing plates 21. One lever member 29 projects beyond the periphery of the disc 10 and pivotably secured to the projecting end 32 thereof is an operating rod 33 which extends axially adjacent the periphery of the disc to be pivotally secured on the other side of the disc to one end of a bifurcated operating lever 34 which is pivotally secured intermediate its ends to the other lever member 30 by means of a pin 35. The arrangement is such that angular movement of the operating lever 34 towards the disc 10 causes the lever members 29 and 30 to move towards the disc thereby forcing the friction pads 20 into frictional engagement with the braking surfaces of the disc or rotor 10.

Pivotally secured to the operating lever 34 adjacent the end remote from the operating rod 33 is a thrust rod 36 of a brake actuating mechanism. The brake actuating mechanism comprises a cylinder 37 supported on a nonrotatable part of the vehicle and piston 38 fluid-tightly mounted therein. The piston 38 is adapted to be moved towards the disc upon the introduction of pressurised fluid into the cylinder 37 via the inlet port 39.

Also pivotally secured to the operating lever 34 at the same pivot point as the thrust rod 36 is a further lever 40 at the other end of which a handbrake cable 41 is secured. A lever 42 is pivotally mounted at one end on the slotted bracket 28 of the caliper-type housing 11. The other end of the lever 42 is pivotally mounted on the lever 40 intermediate the ends thereof.

Movement of the handbrake cable 41 axially away from the disc pivots the lever 40 about the lever 42 to effect movement of the operating lever 34 towards the disc and thereby apply the brake as previously described.

A pair of springy but deformable retractor fingers 43 extend from the slotted brackets 28 alongside each lever member 29 and 30 and are turned over at their ends to engage in holes 44 in the lever members. The retractor fingers are rigidly secured respectively, one to each of the brackets 28 by bolts 45 and have sufficient resilience to retract the lever members 29, 30 after each brake application but are capable of being progressively deformed as wear of the friction pads takes place, consequently the extent of retraction following each brake application remains the same and the running clearance of each friction element from its coacting rotor surface remains the same.

A pair of springy retaining clips 46 are rivetted one to each pad backing plate 21 such that they engage on a peg 47 attached to the respective lever members 29, 30 to ensure that the friction pads or elements are withdrawn from the disc after each brake application.

An automatic adjuster preferably of the type described in my co-pending British patent application No. 22,350/60 dated June 25, 1960 is mounted between the bifurcated arms of the operating lever 34 to shorten the effective length of the operating rod to maintain the friction pads 20 at the desired clearance in the "brakes off" position as wear of the friction surface occurs.

The disc brake assembly described herein possesses not only the advantage of the brake described in British patent specification No. 709,305 but also, as will be seen from FIGURE 3 the advantage that it is only necessary to remove the bolts 25, 26 and thereby remove the retaining member 24 from the guide member 13 to permit the friction elements to be withdrawn from the apertures 19 in a radial direction.

Although the present invention has been illustrated and described in connection with a single example embodiment, it will be understood that this is illustrative of the invention and is by no means restrictive thereof. It is reasonably to be expected that those skilled in the art can make numerous revisions and adaptations of the invention to suit individual design requirements, and it is intended that such revisions and adaptations will be included within the scope of the following claims as equivalents of the invention.

Having now described my invention, what I claim is:

1. In a disc brake assembly including an annular rotor, the structure comprising: a nonrotatable sheet-metal guide member extending angularly over the outer periphery of the rotor and including folded portions, spaced one on each side of said rotor to provide limbs which straddle the periphery of the rotor, each of said limbs having apertures one on each side of the rotor which merge with one another to constitute an open space in the portion of the guide member which bridges the periphery of said rotor, a pair of friction elements axially slidably located one in each of said apertures and anchoring against the sides which constitute the angularly spaced edges of said apertures, means for forcing said friction elements into engagement at opposite sides of said rotor, and removable retaining means proportioned to extend over and bridge the radial gap in the guide member to confine the friction elements in their associated apertures.

2. In a disc brake assembly including an annular rotor, the structure comprising: nonrotatable formable metal caliper guide means extending angularly over a sector of the rotor and including folded portions which straddle the periphery of the rotor to provide limbs adjacent each annular braking surface of the rotor, each of said limbs having an axially-extending aperture, said apertures one at each side of the rotor being merged one with another to constitute an open space at the portion which bridges the periphery of the rotor and provides at its angularly spaced ends bearing surfaces which define both anchoring and guidance surfaces a fixed distance from the contiguous braking surface of the rotor, two friction members proportioned to be slidably received one within each of said axially-extending apertures and with the ends thereof in slidable torque-communicating relation with the anchoring surfaces of said aperture to permit free axial movement while constraining circumferential movement of said friction members circumferentially, fixed torque-taking means secured to a nonrotatable structure and operatively secured to said caliper whereby the torque-reaction force is transmitted from the friction member engagement with the rotor to said caliper, and then to said fixed torque-taking means, retaining means extending over and bridging the radially outward portion of said aperture formed in said caliper and providing retaining surfaces for confining said friction members within said associated apertures, removable securing means for attaching said retaining means to said caliper and removable for detaching said retaining means and thereby providing radial removal of said friction members from within their associated guidance and anchoring surfaces, and a fluid pressure responsive motor movable to effect forcible application of said friction members against the rotor.

3. In a disc brake assembly including an annular rotor, the structure comprising: nonrotatable formable metal caliper guide means extending angularly over a sector of the rotor and including folded portions which straddle the periphery of the rotor to provide limbs adjacent each annular braking surface of the rotor, each of said limbs having an axially-extending aperture, said apertures one at each side of the rotor being merged one with another to constitute an open space at the portion which bridges the periphery of the rotor and provides at its angularly spaced ends bearing surfaces which define both anchoring and guidance surfaces a fixed distance from the contiguous braking surface of the rotor, two friction members proportioned to be slidably received one within each of said axially-extending apertures and with the ends thereof in slidable torque-communicating relation with the anchoring surfaces of said aperture to permit free axial movement while constraining circumferential movement of said friction members circumferentially, fixed torque-taking means secured to a nonrotatable structure and operatively secured to said caliper whereby the torque-reaction force is transmitted from the friction member engagement with the rotor to said caliper, and then to said fixed torque-taking means, retaining means extending over and bridging the radially outward portion of said aperture formed in said caliper and providing retaining surfaces for confining said friction members within said associated apertures, removable securing means for attaching said retaining means to said caliper and removable for detaching said retaining means and thereby providing radial removal of said friction members from within their associated guidance and anchoring surfaces, said retaining means being disposed radially outwardly of said rotor and removable to provide outward displacement of said friction members in a radial direction and subsequent replacement of other friction members within each of said axially-extending apertures.

4. A disc brake assembly in accordance with claim 2 wherein each of said friction elements comprises a segment of friction material providing a frictional surface of engagement with said rotor, and a backing plate at the side of said friction element remote from its rotor-engaging side.

5. A disc brake assembly in accordance with claim 4 wherein each of said backing plates includes a transverse projecting portion which is engageable with a complementary projecting portion of the other of said friction elements to provide guidance therebetween.

6. A disc brake assembly in accordance with claim 5 in which said transverse portions are in slidable bearing engagement with said removable retaining means.

References Cited by the Examiner

UNITED STATES PATENTS

| 2,951,561 | 9/1960 | Davis | 188—152 |
| 2,997,137 | 8/1961 | Hodkinson | 188—152 |
| 3,053,346 | 9/1962 | Butler | 188—73 |
| 3,100,553 | 8/1963 | Butler | 188—152 X |
| 3,124,217 | 3/1964 | Butler | 188—73 |

FOREIGN PATENTS

| 614,338 | 2/1961 | Canada. |
| 936,222 | 9/1963 | Great Britain. |
| 1,037,217 | 8/1958 | Germany. |
| 1,146,235 | 3/1963 | Germany. |
| 1,207,766 | 9/1959 | France. |
| 1,221,369 | 1/1960 | France. |
| 1,244,756 | 9/1960 | France. |

MILTON BUCHLER, *Primary Examiner.*

EUGENE G. BOTZ, ARTHUR L. LA POINT,
*Examiners.*